US 3,118,933
Patented Jan. 21, 1964

3,118,933
N-(α-METHYL-2,4-DICHLOROPHENETHYL) HYDROXYLAMINE AND ITS SALTS
Moses Wolf Goldberg, Upper Montclair, and Marcel Muller, Passaic, N.J., assignors to Hoffmann-La Roche Inc., Nutley, N.J., a corporation of New Jersey
No Drawing. Filed Dec. 28, 1959, Ser. No. 862,050
5 Claims. (Cl. 260—501)

This invention relates to novel chemical compounds and to a novel method for preparing the same. More particularly, the invention relates to the novel compounds: N-(α-methyl-2,4-dichlorophenethyl)hydroxylamine and acid addition salts thereof; and to methods of preparing said novel compounds.

N-(α-methyl-2,4-dichlorophenethyl)hydroxylamine and acid addition salts thereof, more particularly acid addition salts thereof with pharmaceutically acceptable acids, are useful as appetite reducing agents. By "pharmaceutically acceptable acids" is meant those inorganic and organic acids which are encountered in pharmaceutical practice, such as hydrochloric acid, hydrobromic acid, hydriodic acid, nitric acid, phosphoric acid, acetic acid, malic acid, oxalic acid, p-toluenesulfonic acid, and the like.

N-(α-methyl-2,4-dichlorophenethyl)hydroxylamine and its acid addition salts with pharmaceutically acceptable acids, as stated above, are useful as appetite depressants. They are characterized by a high anorectic effect, which can be measured in terms of reduction of food intake or of weight decrease, and by a comparative lack of CNS-stimulant activity.

The invention further provides methods for preparing the novel base, N-(α-methyl-2,4-dichlorophenethyl)hydroxylamine. These methods comprise reducing 1-(2,4-dichlorophenyl)-2-nitropropene with lithium aluminum hydride at low temperatures in the range between about minus 40° C. and about 0° C. Ordinarily it will be convenient to dissolve both the lithium aluminum hydride and the nitropropene compound in an inert organic solvent, such as ether or tetrahydrofuran or mixtures thereof. The reduction reaction is preferably effected at temperatures between about minus 40° C. and minus 30° C.

The invention further provides methods of preparing acid addition salts of N-(α-methyl-2,4-dichlorophenethyl)-hydroxylamine. A convenient method comprises reacting the base with an equivalent quantity of the desired acid; or preferably with a slight excess over the equivalent quantity. Advantageously, this reaction is effected in liquid phase, i.e. with both reactants in solution in inert solvents.

The invention is further disclosed in the following examples, which are illustrative but not limitative thereof. Temperatures are stated in degrees centigrade, corrected.

Example 1

A quantity, 23 g., of 1-(2,4-dichlorophenyl)-2-nitropropene was dissolved in 300 ml. of ether and the solution was added to a well stirred solution of 3.7 g. of lithium aluminum hydride in 200 ml. of ether, previously cooled to minus 40° by means of an acetone-solid carbon dioxide mixture. Cooling was continued during the reaction to keep the temperature from rising above minus 30°. After all of the nitropropene compound had been added, the cooling bath was removed, and the lithium aluminum hydride complex and unreacted lithium aluminum hydride were decomposed by addition of 50 ml. of wet ether and 10 ml. of saturated aqueous sodium sulfate solution. The granular precipitate was filtered off and was washed with 100 ml. of ether. The ether filtrate was combined with the ether washings, and the combined solutions were extracted three times, each time with 100 ml. of 1 N hydrochloric acid. The aqueous acid extracts were combined, adjusted to pH 9 by addition of saturated aqueous sodium carbonate solution, and then the mixture was extracted three times, each time with 100 ml. of ether. The combined ether extracts were washed with water, dried with sodium sulfate, and evaporated to dryness. There was thus obtained a white solid, N - (α - methyl - 2,4 - dichlorophenethyl)-hydroxylamine, M.P. 79–80°.

Example 2

Ten g. of the end product of Example 1 was dissolved in 50 ml. of ether and mixed with a solution of 10 g. of p-toluene-sulfonic acid in 200 ml. of ether. The precipitated solid material was filtered off and recrystallized from acetonitrile. The compound, N-(α-methyl-2,4-dichlorophenethyl)hydroxylamine p-toluenesulfonate, thus obtained melted at 153°.

An additional quantity of 10 g. of N-(α-methyl-2,4-dichlorophenethyl)hydroxylamine, obtained as described in Example 1, was dissolved in 50 ml. of ether and was reacted with a solution of 5 g. of oxalic acid in 50 ml. of ether. The solid material obtained was recrystallized from ethanol/ether. There was thus obtained the neutral oxalate of N-(α-methyl-2,4-dichlorophenethyl)hydroxylamine, M.P. 149–150°.

An additional quantity of 5 g. of N-(α-methyl-2,4-dichlorophenethyl)hydroxylamine, obtained as described in Example 1, was dissolved in 25 ml. of ether and the solution was reacted with 10 ml. of 10% (w./v.) ethereal hydrochloric acid. The solvent was evaporated in vacuo, leaving N - (α - methyl-2,4-dichlorophenethyl)hydroxylamine hydrochloride as an oil which did not crystallize readily.

An additional quantity of 5 g. of N-(α-methyl-2,4-dichlorophenethyl)hydroxylamine, obtained as described in Example 1, was dissolved in 20 ml. of ethanol and the solution was reacted with 8 ml. of 20% (w./v.) aqueous nitric acid. The solvent was evaporated in vacuo. The N - (α - methyl,2,4-dichlorophenethyl)hydroxylamine nitrate remained as an oil, which did not crystallize readily.

An additional quantity, 5 g., of the base, obtained as described in Example 1, was dissolved in 30 ml. of ethanol and the solution was reacted with 6 ml. of 20% (w./v.) aqueous sulfuric acid. After evaporation of the solvents, the N - (α - methyl-2,4-dichlorophenethyl)hydroxylamine sulfate was obtained as an oil, which did not crystallize readily.

An additional quantity, 5 g., of the base, obtained as described in Example 1, was dissolved in 25 ml. of ether and the solution was reacted with 3 ml. of 50% (w./v.) methanolic phosphoric acid. The solvents were evaporated in vacuo, leaving an oil, N-(α-methyl-2,4-dichlorophenethyl)hydroxylamine phosphate.

We claim:
1. A compound selected from the group consisting of N-(α-methyl-2,4-dichlorophenethyl)hydroxylamine and acid addition salts thereof with pharmaceutically acceptable acids.
2. N-(α-methyl-2,4-dichlorophenethyl)hydroxylamine.
3. An acid addition salt of the compound of claim 2 with a pharmaceutically acceptable acid.
4. N-(α-methyl-2,4-dichlorophenethyl)hydroxylamine p-toluene-sulfonate.
5. N-(α-methyl-2,4-dichlorophenethyl)hydroxylamine oxalate.

References Cited in the file of this patent

UNITED STATES PATENTS

| | | |
|---|---|---|
| 2,233,823 | Susic et al. | Mar. 4, 1941 |
| 2,495,404 | Biedermann | Jan. 24, 1950 |
| 2,527,810 | Goldberg et al. | Oct. 31, 1950 |
| 2,709,700 | Szabo et al. | May 31, 1955 |
| 2,852,562 | Surrey | Sept. 16, 1958 |

FOREIGN PATENTS

| | | |
|---|---|---|
| 790,167 | Great Britain | Feb. 5, 1958 |

OTHER REFERENCES

Schales: J. Am. Chem. Soc., vol. 74, 1952, page 4488.
Marsh: Jour. Pharm. and Exp. Therap., vol. 94, page 195.
Gilsdorf et al.: "Jour. Am. Chem. Soc.," vol. 74, pages 1837 to 1842 (1952).
"Comptes Rendus," vol. 198, page 1867 (1934).